United States Patent [19]

James

[11] Patent Number: 5,219,226

[45] Date of Patent: Jun. 15, 1993

[54] IMAGING AND TEMPERATURE MONITORING SYSTEM

[75] Inventor: Richard K. James, Redmond, Wash.

[73] Assignee: Quadtek, Inc., Redmond, Wash.

[21] Appl. No.: 782,262

[22] Filed: Oct. 25, 1991

[51] Int. Cl.$^5$ .............................................. G01J 5/08
[52] U.S. Cl. ..................,............... 374/124; 374/137; 374/120; 340/709
[58] Field of Search ............... 374/121, 124, 128, 137; 358/93, 107, 113, 125; 364/557; 250/330; 356/43; 340/709

[56] References Cited

U.S. PATENT DOCUMENTS

| | | | |
|---|---|---|---|
| 3,544,710 | 12/1970 | Poos ........................................ | 178/6 |
| 4,217,608 | 8/1980 | MacGregor et al. ................ | 358/113 |
| 4,403,251 | 9/1983 | Domarenok et al. ................ | 358/107 |
| 4,463,437 | 7/1984 | Schenck et al. ..................... | 364/557 |
| 4,520,390 | 5/1985 | Paredes et al. ....................... | 358/108 |
| 4,539,588 | 9/1985 | Ariessohn et al. ................... | 358/113 |
| 4,576,432 | 3/1986 | Rüger .................................. | 374/124 |
| 4,687,344 | 8/1987 | Lillquist .............................. | 374/124 |
| 4,733,079 | 3/1988 | Adams et al. ..................... | 374/124 X |
| 4,737,844 | 4/1988 | Kohola et al. ....................... | 358/100 |
| 4,737,917 | 4/1988 | Perron ................................. | 364/473 |
| 4,746,224 | 5/1988 | Mizuno et al. ...................... | 374/128 |
| 4,794,452 | 12/1988 | Taft et al. ............................ | 358/100 |
| 4,803,474 | 2/1989 | Kulp .................................... | 340/709 |
| 4,840,496 | 6/1989 | Elleman et al. ..................... | 374/124 |
| 4,847,604 | 7/1989 | Doyle ............................. | 340/709 X |
| 5,011,297 | 4/1991 | Tittl .................................... | 374/141 |
| 5,085,525 | 2/1992 | Bartosiak et al. ................... | 374/124 |
| 5,094,544 | 3/1992 | Ignatowicz ..................... | 374/124 X |

OTHER PUBLICATIONS

Product Bulletin, "Ircon Line Scanning Infrared Thermometer System," PB-Scan-2, pp. 1-17.
Product Bulletin, "E$^2$T's Pulsar II: Continuous Temperature Surveillance for Rotating Kilns, Model 7000-CTS".

Primary Examiner—William A. Cuchlinski, Jr.
Assistant Examiner—G. Bradley Bennett
Attorney, Agent, or Firm—Christensen, O'Connor, Johnson & Kindness

[57] ABSTRACT

An imaging and temperature monitoring system (10) is disclosed for displaying an image of an environment (E), along with information regarding the temperature of select regions (R) within the environment. The system includes a sensor head (12) equipped with a video imager (26) for producing a video image of the environment. The sensor head also includes a pyrometer (22) mounted on a computer-controlled translation stage (24), which allows the pyrometer to directly collect temperature information from the various regions. The combined imaging and temperature monitoring functions are advantageously achieved without tradeoffs in the performance of either function.

17 Claims, 4 Drawing Sheets

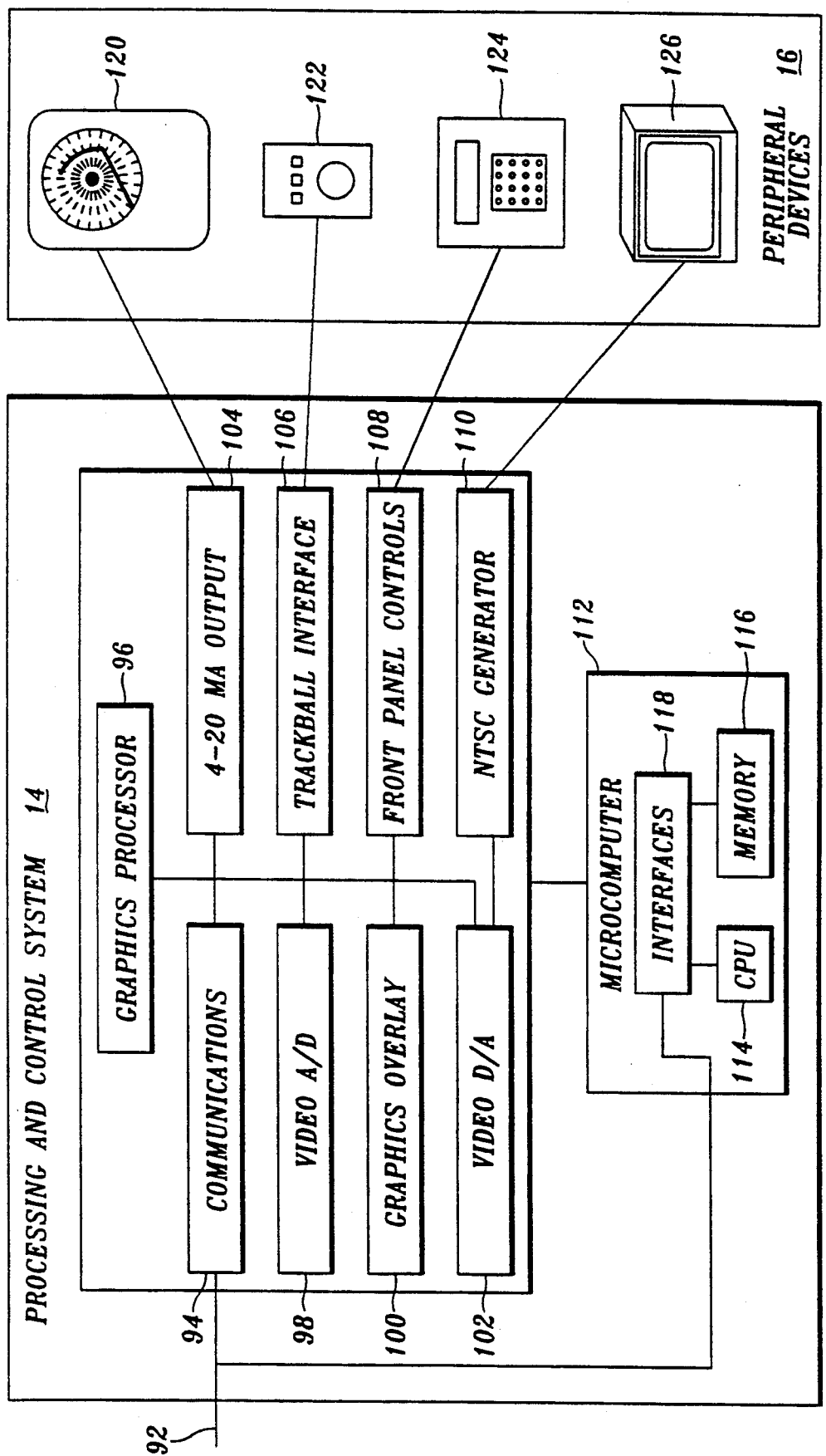

IMAGING AND TEMPERATURE MONITORING SYSTEM

FIELD OF THE INVENTION

This invention relates generally to imaging systems and, more particularly, to systems for producing images of objects and for monitoring the temperature of the imaged objects.

BACKGROUND OF THE INVENTION

The efficiency and effectiveness of many industrial processes depends on the temperatures at which the processes are performed. For example, a kiln's ability to harden or dry substances depends, at least in part, upon the kiln's temperature. Similarly, the efficiency of a furnace in converting fuel into thermal energy, and the ability of a recovery boiler to extract chemicals from waste material, is temperature-dependent.

To control a process performed by such a system, the temperature of the system must be monitored. Information is collected regarding the temperature of the area in which the process is actually being performed. This process area may include solid, liquid, and gaseous objects whose temperatures are to be measured. In some instances, a general indication of the temperature of the process area is desired. In other cases, information regarding the spatial distribution of temperature over the process area is needed.

One of the simplest ways that information regarding the temperature of a process area can be obtained is through direct visual observation of the area. For visual observation of temperature patterns to be possible, the process area must be sufficiently hot to emit radiation that can be seen by the operator. The temperature of the process area is then interpreted based upon the color or wavelength of the emitted radiation.

In that regard, the wavelengths and intensity of the emitted radiation depend upon the temperature and material composition of objects included in the area. For a given material, the wavelength corresponding to the peak spectral intensity is inversely proportional to temperature. By observing the apparent color of the process area, some indication of temperature can, thus, be obtained.

Direct visual observation also advantageously provides the operator with a good deal of nonthermal information that may be useful in controlling a process. For example, by directly viewing the process, an operator may be able to monitor objects whose location or size, rather than temperature, influence the process. The use of direct visual observation to monitor process temperature does, however, have several limitations.

More particularly, the process may take place at temperatures that are too high to allow direct visual observations to be easily or safely conducted. Further, direct visual observations often provide, at best, rough qualitative estimates of temperature that may be entirely inadequate for the required process control. In still other instances, temperature information must be collected from a number of sites, limiting the ability of a single individual to directly observe the operation at each site.

To overcome the limitations of direct visual observation, a variety of remote monitoring systems have been developed. For example, a simple system includes a camera connected to a remote monitor or display. The camera focuses radiation from the process area to produce an optical image that is converted to a video image of the area.

While a camera responsive to visible radiation may be used, in many applications the intensity of infrared emissions from the process area will be greater than emissions in the visible portion of the spectrum. Further, environmental factors related to the process environment may interfere with infrared emissions less than visible emissions. For these reasons, an infrared camera may be used to produce a video image representative of the intensity of received infrared radiation and, hence, the temperature of the viewed area.

In either case, the video image is transferred to the monitor for display. An operator viewing the monitor can then make a qualitative assessment of the way in which temperature varies over the imaged area.

Temperature monitoring systems have also been developed to provide quantitative or absolute temperature measurements. One example of such a system is the product sold by the assignee of the present application, Quadtek, Inc., under the trademark M702. The M702 system includes a pyrometer that is integrated into an infrared camera, which is, in turn, coupled to a monitor. The position of the pyrometer, relative to the camera, is fixed.

In the M702 system, the camera receives infrared radiation from the process area and provides a video output to the monitor. The pyrometer also receives radiation from a limited region of the process area viewed by the camera and provides a pyrometer output to the monitor. The monitor responds to the outputs from the camera and pyrometer by producing a displayed image of the process area and an indication of the temperature of the single region of the process area monitored by the pyrometer.

A slightly more complex system is sold by $E^2$ Technology Corp. of Ventura, Calif., under the trademark 7000-CTS. The 7000-CTS system is a scanning temperature measurement system, which includes an infrared thermometer and a television camera. Although the position of the thermometer relative to the camera is fixed, a scanning head allows the position of the combined thermometer and camera to be adjusted. The camera is used by the operator to sight the area whose temperature is monitored by the thermometer.

Although the 7000-CTS scanning thermometer system does allow the temperature of more than one fixed region to be determined, it has several limitations. First, because both the thermometer and camera are scanned, a relatively large, bulky, and expensive scanning head is required. Further, due to the bulk of the scanned components, the scanning speed of the system is limited and may present problems when relatively continuous temperature information must be collected over large or dispersed regions of the area.

A more sophisticated temperature monitoring system is offered by Quadtek, Inc. under the trademark CALICO. The CALICO system includes a pyrometer, video imager, temperature analyzer, and monitor. The video imager is, for example, an infrared camera that produces a video image representing the intensity of infrared emissions received from the process area. The pyrometer produces a reference temperature output in response to radiation received from a single reference region included in the area viewed by the infrared camera. In operation, the CALICO imager and pyrometer pass the video image and reference temperature data to the temperature analyzer.

The temperature analyzer determines the shading or coloring of the portion of the video image associated with the reference region. The relationship between video shading and the measured reference temperature is then determined. As a result, the temperature analyzer is able to determine the absolute temperature of the imaged area at select regions of interest, other than the reference region viewed by the pyrometer, in the following manner.

The temperature analyzer first determines the location of the select region of interest on the video image. The temperature analyzer then computes the temperature associated with the shading of the video image at this point. Because the relationship between shading and temperature has already been accurately defined for the reference point, that information can then be used to calibrate a determination of temperature based upon the shade of any other point on the video image.

As will be appreciated, the output of the infrared camera of the CALICO system is used both to generate a video image of the process area and to measure temperature. The pyrometer simply provides continuous calibration of the temperature measurements based upon the camera output. Because the camera is used both to image the area of interest and to monitor temperature, its performance can typically be optimized for only one of the two tasks.

In that regard, with the camera output used for imaging, it may be desirable to alter the shading of the video image to lighten or darken specific regions of the image for better visibility. If the camera output is also used for temperature measurement, however, such shading corrections might adversely influence the interpretation of temperature. Similarly, if the displayed image generally lacks sufficient contrast, the black level or contrast of the image can be offset accordingly. Again, however, such an adjustment might adversely influence temperature measurements based upon the same image.

Another potential limitation concerning the use of the camera output for imaging and temperature measurement relates to the desired linearity or nonlinearity of the two functions. In that regard, a camera having a nonlinear response may result in good image production, but skew temperature measurements. Alternatively, a camera having a linear response may provide a truer temperature measurement, but less useful image information.

Finally, the minimum temperature that can be sensed by the CALICO system is limited by the available wavelength range that conventional infrared cameras respond to. Because most conventional infrared cameras respond only to radiation shorter than 1.8 microns, the system is typically limited to monitoring temperatures above 1470 degrees Fahrenheit (800 degrees Centigrade).

In view of these observations, it would be desirable to provide an imaging and temperature monitoring system that produces an image of the area of interest and absolute temperature information regarding select points within the area of interest, without exhibiting performance tradeoffs.

SUMMARY OF THE INVENTION

This invention relates to a system for monitoring the temperature of select regions of an area of interest. In accordance with a particular aspect of the invention, the system includes an imaging device for receiving radiation from the area of interest and producing an image output that represents an image of the area. The system also includes a temperature-sensitive device for receiving radiation from at least one of the select regions included in the area and producing a temperature output that represents the temperature of the one of the select regions. A controller is included to control which of the at least one select regions radiation is received from by the temperature-sensitive device.

BRIEF DESCRIPTION OF THE DRAWINGS

The invention will presently be described in greater detail, by way of example, with reference to the accompanying drawings, wherein:

FIG. 6 is a block diagram of a processing and control system and various peripheral devices included in the system of FIG. 1.

DETAILED DESCRIPTION OF THE PREFERRED EMBODIMENT

Figure 1:
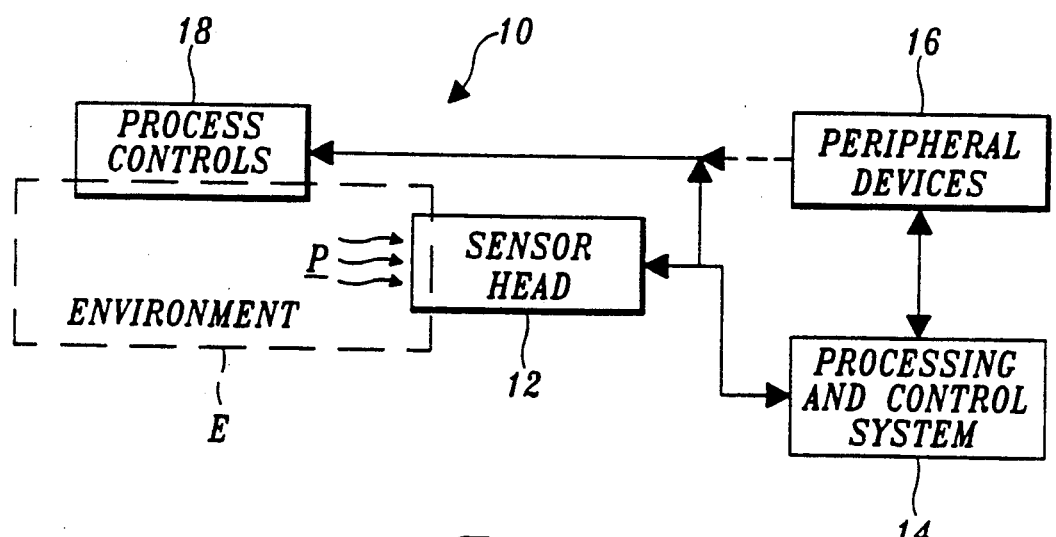
FIG. 1 is a block diagram of an imaging and temperature monitoring system constructed in accordance with this invention.

Referring now to FIG. 1, an imaging and temperature monitoring system 10 constructed in accordance with this invention is illustrated. The system 10 includes a sensor head 12 that is exposed to an environment E. The sensor head 12 provides outputs to a processing and control system 14 which, in turn, causes a visible image of environment E to be displayed by peripheral devices 16, along with information regarding the temperature of environment E. As will be described in greater detail below, the construction of system 10 advantageously allows both the visible image and the temperature information to be produced simply and with heretofore unachieved accuracy.

Before addressing the system 10 in greater detail, the environment E that system 10 is used with will be briefly considered. As will be appreciated, the present invention is useful for providing image and temperature information relating to the status of, and processes carried out in, a variety of environments E. Such environments E may include solid, liquid, and gaseous objects that are to be imaged and whose temperatures are to be measured.

Some of the thermal energy of these objects is typically radiated in the form of electromagnetic waves. This radiation may include portions of both the visible and infrared segments of the electromagnetic spectrum. It is the analysis of this radiation that allows the temperature of the objects to be evaluated noninvasively, i.e., without requiring physical contact with environment E.

In that regard, radiation from a process area P included in environment E is received by the sensor head 12, where it is converted to an optical image and then an electronic or video image of area P. The sensor head 12 also uses at least a portion of the optical image to determine the temperature of one or more regions R located in the process area P. The video image and temperature data are then transferred from the sensor head 12 to the processing and control system 14.

The peripheral devices 16, which are coupled to the processing and control system 14, display an image of the process area P for the operator of system 10. The peripheral devices 16 also provide measurements of the absolute temperature of regions R of area P. Peripheral devices 16 allow the operator to provide system 10 with various inputs necessary to initiate the desired operation of system 10.

Process controls 18 may also be included to regulate the operation of a process within environment E. In that regard, controls 18 receive temperature and, perhaps, image data from system 14 and analyze that data to determine the requisite adjustments to be made to the process. As indicated by the broken line of FIG. 1, the process controls 18 may also receive inputs from the operator via peripheral devices 16.

1. Sensor Head Construction

Figure 2:
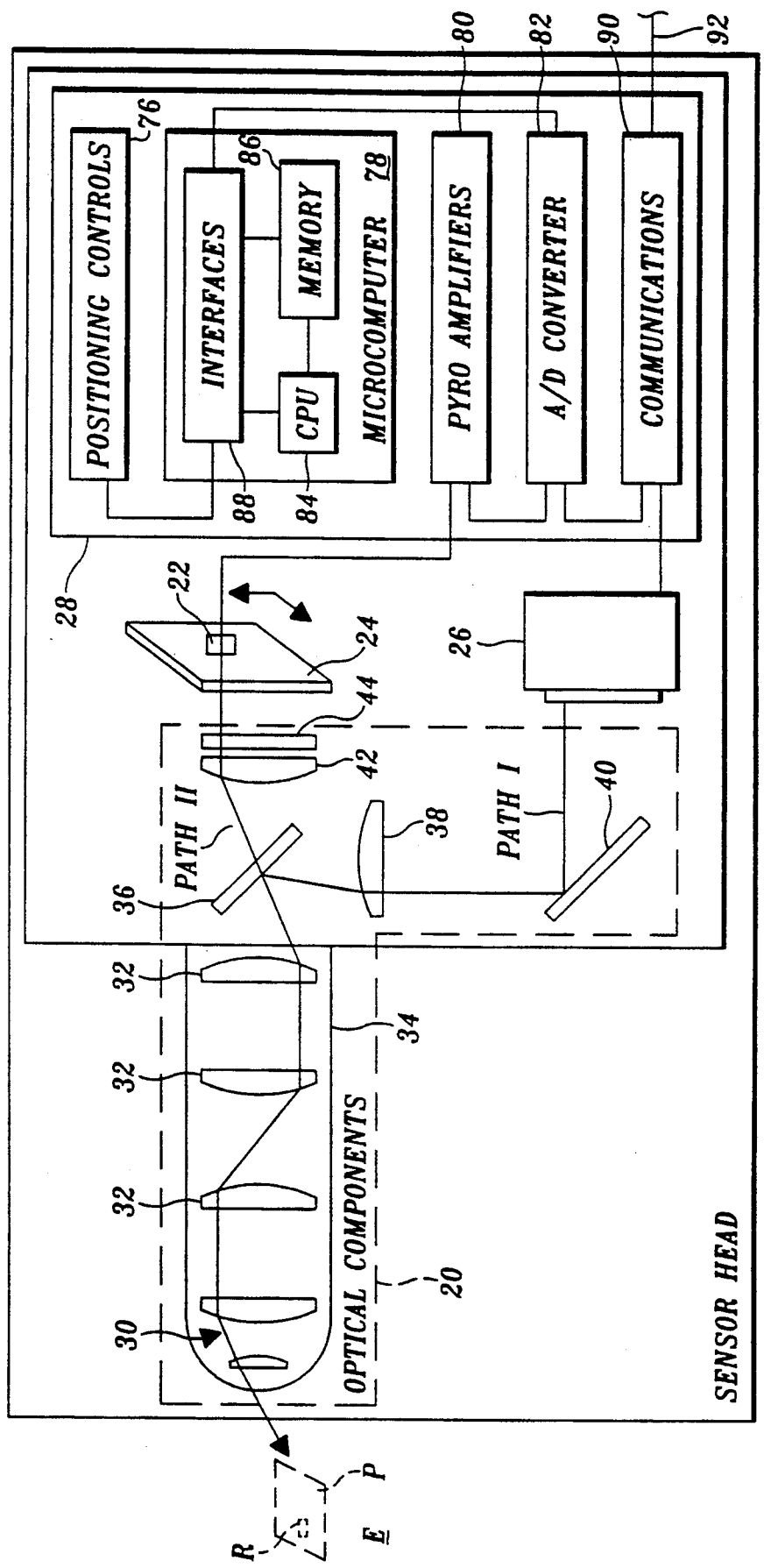
FIG. 2 is a schematic illustration of a sensor head included in the system of FIG. 1.

Reviewing now the components of system 10 in greater detail, reference is had to FIG. 2. As shown, sensor head 12 includes a number of elements. Specifically, in a preferred arrangement, sensor head 12 includes a group of optical components 20, a pyrometer 22, an adjustable translation stage 24, a video imager 26, and electronics section 28.

The optical components 20 receive visible and infrared radiation from the process area P of environment E and provide an optical image of the process area P to pyrometer 22 and video imager 26. Optical components 20 include objective lenses 30 and transfer lenses 32, fitted within a lens tube 34. Objective lenses 30 preferably form a wide-angle element that allows an optical image of a relatively large process area P to be formed. The optical image is transmitted from objective lenses 30 through the series of transfer lenses 32, which collect and collimate the image.

Optical components 20 also include a beam splitter 36 that splits the optical image formed by the components within lens tube 34 into two components. More particularly, depending upon the nature of the video imager used, beam splitter 36 reflects a visible or infrared wavelength component of the optical image along a first path I. An infrared wavelength component of the optical image also passes through beam splitter 36 and traverses a second path II.

The portion of the optical image traversing path I passes through several additional optical components 20. A lens 38 passes the image to a mirror 40, which reflects the image to video imager 26. Lens 38 focuses the optical image for the entire viewed area on video imager 26. Mirror 40 introduces a fold into path I to accommodate space restrictions within sensor head 12.

The portion of the optical image traversing path II also passes through several additional optical components 20. Specifically, a lens 42 passes the image to an optical filter 44 before the image is received by pyrometer 22. Although lens 42 focuses the infrared portion of the optical image for the entire viewed area, as will be explained in greater detail below, the pyrometer detector is relatively small. Thus, only a portion of the path II optical image, corresponding to a single region R of the process area, actually impinges on the detector. By adjusting the relative alignment of pyrometer 22 and the focused optical image of the entire viewed area, however, radiation can be collected from various regions R within the imaged area. The filter 44 ensures that the radiation passed to pyrometer 22 has the appropriate spectral content.

As will be appreciated, the characteristics of the various optical components 20 can be varied depending upon the environment is which the system is intended to operate, as well the desired wavelengths involved in the image and temperature measurement processes. In a preferred arrangement, the various optical components 20, except lens 42 and filter 44, are part of a closed-circuit television camera sold by Quadtek, Inc. under the trademark LYNX.

Reviewing now some of the other components of sensor head 12 in greater detail, the pyrometer 22 is, for example, a radiation pyrometer. Pyrometer 22 measures the temperature of a hot object by focusing the thermal radiation emitted by the object.

In a currently preferred arrangement, pyrometer 22 is an optical radiation pyrometer, which evaluates the incandescent brightness of a hot object to determine the object's temperature. Pyrometer 22 produces a single output that effectively represents an average of the temperature of the viewed region R. As will be described in greater detail below, this output is used by the electronics section 28 to determine the region's temperature.

Pyrometer 22 includes a square sensor or detector that receives a portion of the focused optical image corresponding to a limited region R of the process area P. Pyrometer 22 has an effective field of view of 0.6 degrees by 0.6 degrees, when used in conjunction with optical components 20. Thus, pyrometer 22 normally views a region R representing roughly 0.01% of the process area P that is viewed. As will be described in greater detail below, however, in the preferred arrangement, pyrometer 22 is adjustably positioned for movement in a plane that is orthogonal to path II of the radiation, allowing it to receive radiation from different regions of the process area.

Depending upon the environment E involved, pyrometer 22 may advantageously be a one-color pyrometer or a two-color pyrometer. A one-color pyrometer is typically responsive to a limited band of radiation, corresponding to the pass band of filter 44. The output produced by such a one-color pyrometer is proportional to the intensity of the radiation received in that band. In one arrangement, a pyrometer responsive to the middle of the infrared spectrum may be used in systems designed to measure temperatures in various ranges spanning 400–2600 degrees Fahrenheit (200–1430 degrees Centigrade).

A two-color, or ratio, pyrometer produces an output that is based upon the ratio of the intensity of the radiation received at two different wavelengths. A two-color pyrometer may be advantageously used in smoky or dusty environments, because the ratiometric analysis allows measurements to be made with relatively little disturbance by the smoke and dust.

Reviewing the video imager 26 in greater detail, video imager 26 receives the focused optical image of the process area P that is transferred along path I. Video imager 26 responds by generating an electronic or video image corresponding to the optical image of the viewed process area P.

Video imager 26 may be any one of a variety of devices, such as the camera tube of a television camera or a vidicon. One example of a suitable video imager 26 is the Javelin JE2362A solid state camera including a solid state detector, available from Javelin Electronics of Torrance, Calif.

In the preferred arrangement, translation stage 24 moveably supports the pyrometer 22 relative to the focused optical image that is transmitted along path II by the optical components 20. In that regard, as shown in FIG. 3, one embodiment of stage 24 includes a support structure 46, a pair of linear bearings 48 and 50, and a pair of linear stepper motors 52 and 54.

Figure 3:
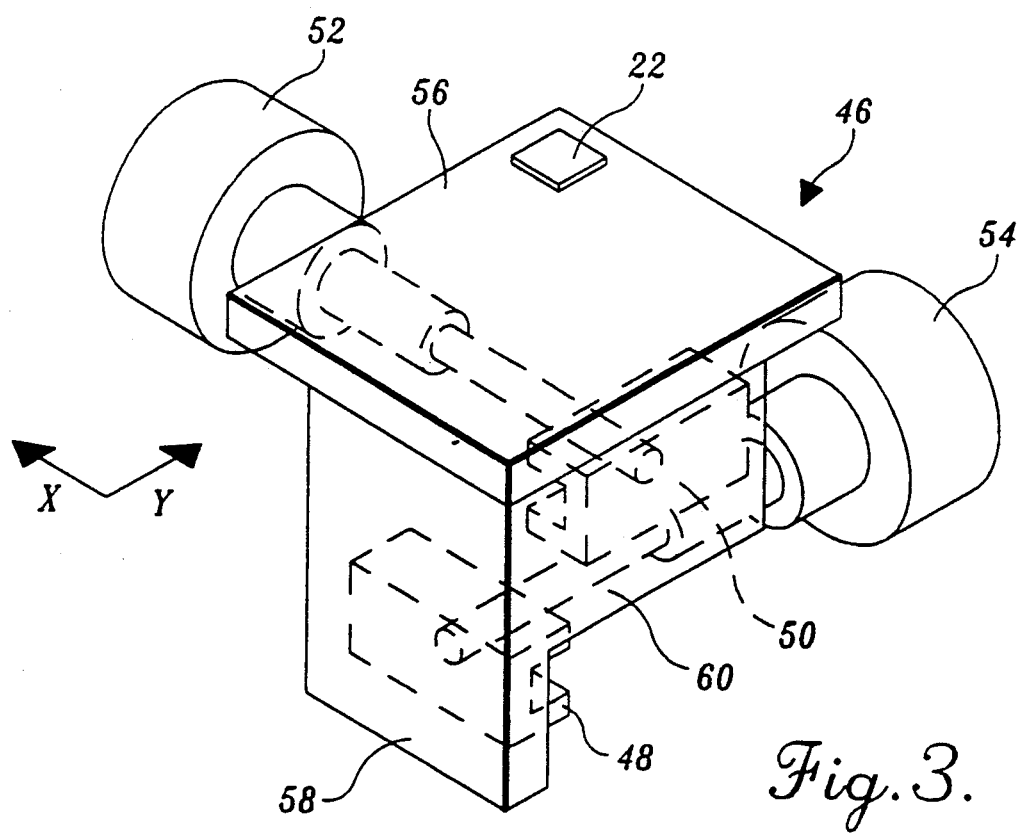
FIG. 3 is an illustration of a translation stage that is used to adjust the position of a pyrometer included in the sensor head of FIG. 2.

The support structure 46 is generally movable along x- and y-coordinate axes, as illustrated in FIG. 3. Support structure 46 in formed by a support plate 56, x-coordinate side plate 58, and y-coordinate side plate 60, which may be fixedly secured together or machined from a single block of material. Pyrometer 22 is attached to the rectangular support plate 56. The rectangular, x-coordinate side plate 58 and y-coordinate side plate 60 extend normal to, and form a corner with, support plate 56.

The linear bearings or ball slides 48 and 50 are of the type sold by Pic Design under the part number PB04-05. The x-coordinate linear bearing 48 is attached to the inner surface of the x-coordinate side plate 58. Specifically, bearing 48 extends along an axis parallel to support plate 56 and spaced-apart therefrom. Similarly, the y-coordinate linear bearing 50 is attached to the inner surface of the y-coordinate side plate 60. Bearing 50 extends along an axis parallel to support plate 56 and spaced-apart therefrom by a distance that is less than the spacing between bearing 48 and plate 56. As a result, bearings 48 and 50 are substantially perpendicular to each other.

The linear stepper motors 52 and 54 are of the type sold by HSI Inc. of Waterbury, Conn. under the part number 26841-05 and are fixedly mounted relative to sensor head 12. The x-coordinate stepper motor 52 includes a shaft that extends normal to the y-coordinate side plate 60 and telescopes in and out in response to electrical inputs applied to motor 52. The projecting end of the shaft engages a mating surface of the y-coordinate bearing 50. The y-coordinate stepper motor 54 includes a shaft, which extends normal to both x-coordinate side plate 58 and the shaft of motor 52 and telescopes in and out in response to electrical inputs to motor 54. The projecting end of the shaft of motor 54 engages a mating surface of x-coordinate bearing 48.

The various components of translation stage 24 cooperate to control the position of pyrometer 22 in the following manner. To adjust the position of pyrometer 22 along the x-axis, an input is applied to the x-coordinate stepper motor 52. In response, the shaft of motor 52 extends or retracts, drawing the y-coordinate bearing 50 along with it in the x-direction. Because the y-coordinate bearing 48 is fixedly attached to side plate 60 of structure 46, structure 46 and pyrometer 22 also are drawn in the x-direction. As structure 46 moves in the x-direction, the end of the shaft of the y-coordinate stepper motor 54 slides in the x-coordinate bearing 48, allowing the position of the y-coordinate stepper motor 54 relative to sensor head 12 to remain fixed.

As will be appreciated, the input to the x-coordinate motor 52 can be altered to control the extension of the shaft and, hence, the translation of stage 24. The y-coordinate motor 54 and bearing 48 are similarly used to control motion of pyrometer 22 in the y-direction. By controlling the x- and y-coordinates of pyrometer 22, pyrometer 22 is thus able to selectively receive radiation from different regions R of the process area P.

Figure 4:
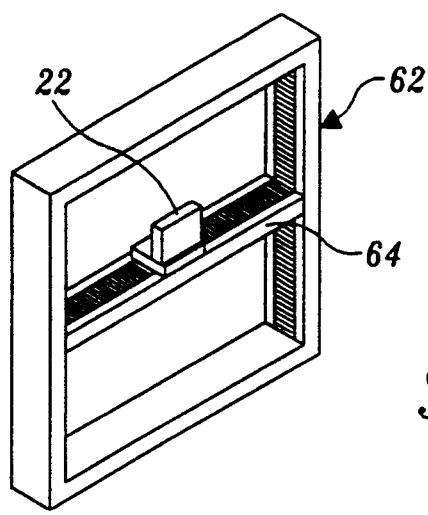
FIG. 4 is an illustration of an alternative construction of the translation stage of FIG. 3.

In an alternative to the arrangement illustrated in FIG. 4, the translation stage 24 may include a rectangular frame 62, provided with a crossbar 64 upon which pyrometer 22 is mounted. A first stepper motor is fixedly attached to frame 62 and is coupled to crossbar 64 by gears (not shown). The first motor and gears drive crossbar 64 relative to frame 62 along an x-axis. Similarly, a second stepper motor is fixedly attached to crossbar 64 and coupled to a platform supporting pyrometer 22 by gears (not shown). The second motor and gears drive pyrometer 22 relative to crossbar 64 along a y-axis. As a result, pyrometer 22 can be scanned in both the x-direction and the y-direction. The stage 24 shown in FIG. 3, however, is currently preferred because it is simpler and does not require one of the stepper motors to be mounted to a movable element (i.e., crossbar 64).

Figure 5:
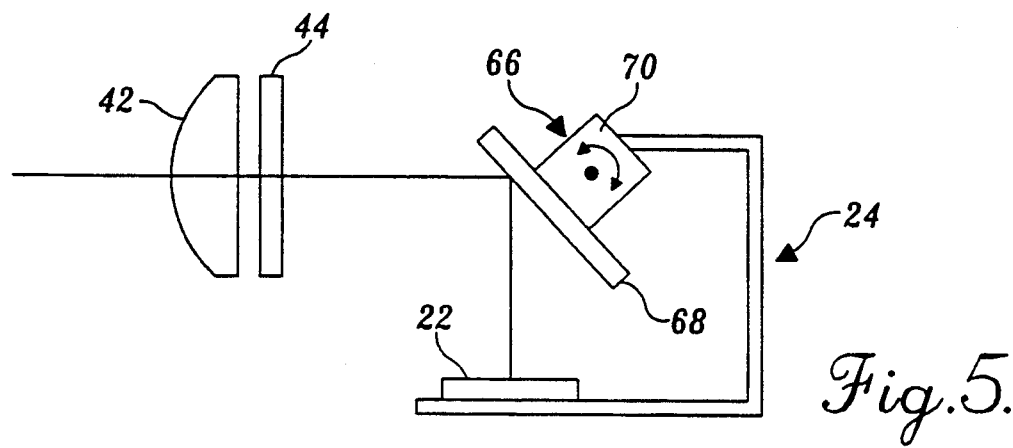
FIG. 5 is an illustration of another alternative embodiment of the stage of FIG. 3.

In yet another embodiment illustrated in FIG. 5, the translation stage 24 is constructed to fixedly support pyrometer 22. As shown schematically in FIG. 5, in this arrangement, a scanning mirror assembly 66 is positioned in path II. Assembly 66 includes a mirror 68 that is gimbaled and driven by a support structure 70. By altering the orientation of mirror 68, the portion of the light traversing path II that impinges upon pyrometer 22 can be controlled. Although this arrangement allows scanning to be accomplished quite rapidly, it is more complex and expensive than the arrangement of FIG. 3.

Addressing the final element of sensor head 12, the electronics section 28 includes a number of components. Specifically, positioning controls 76 are included to provide drive signals to stepper motors 52 and 54. Positioning controls 76 respond to inputs from a microcomputer 78, also included in electronics section 28, and provide appropriately conditioned drive signals to stepper motors 52 and 54. Stepper motors 52 and 54 then initiate the desired adjustments in the position of support structure 46 and pyrometer 22.

At least one pyrometer amplifier 80 is also included in electronics section 28. Amplifier 80 is coupled to pyrometer 22 to amplify the analog output of pyrometer 22 suitably for further processing by, for example, an analog-to-digital (A/D) converter 82. The A/D converter 82, in turn, converts the amplified analog output of pyrometer 22 into digital form for use by microcomputer 78 in determining the temperature of the viewed region R of the process area, as described in greater detail below.

The microcomputer 78 includes a central processing unit (CPU) 84, memory 86, and interfaces 88. Memory 86 of microcomputer 78 is initially loaded with a program that is responsible for controlling the CPU's performance of several tasks. For example, as will be described in greater detail below, the program includes a routine that controls the translation stage 24 and determines which portion of the radiation traversing path II will be received by pyrometer 22. In that regard, the program analyzes information regarding the present position of pyrometer 22, previously stored by CPU 84, as well as the desired change in the pyrometer's position, input via CPU 84 in response to information received from the processing and control system 14. CPU 84 executes the routine to determine the outputs that must be produced by the positioning controls 76 to achieve the desired positional adjustment.

A second routine stored in memory 86 controls the determination of the temperature of the region R. In that regard, a predetermined relationship exists between pyrometer output and temperature for the particular type of pyrometer and process area P involved. This relationship is stored in memory 86 and is accessed by CPU 84 to determine the temperature of the region R in view of the output of pyrometer 22.

A communications block 90, included in electronics section 28, allows information to be efficiently transferred between sensor head 12 and processing and control system 14. For example, communications block 90 preferably includes a multiplexer to multiplex the video output of imager 26 and the digitally processed output of pyrometer 22 for transmission to the processing and control system 14. As will be appreciated, the multiplexing of video and temperature data onto the video cable is not mandatory but is used to simplify the communication block's hardware requirements. Communications block 90 may also include a demultiplexer for demultiplexing information received from the processing and control system 14, such as the desired position of pyrometer 22 and nature of the temperature analysis to be performed.

A video cable 92 transmits the multiplexed output from communications block 90 to the processing and control system 14. As will be described below, video cable 92 also provides control signals to electronics section 28 to achieve the desired control of the various components of sensor head 12.

2. Processing and Control System Construction

Turning now to a more detailed review of processing and control system 14, reference is had to FIG. 6. Processing and control system 14 includes a number of components including a communications block 94, graphics processor 96, analog-to-digital (A/D) converter 98, graphics overlay 100, digital-to-analog (D/A) converter 102, analog current sources 104, trackball interface 106, front panel interface 108, NTSC generator 110, and microcomputer 112.

Reviewing each of these components individually, the communications block 94 receives information from, and transmits information to, sensor head 12. Specifically, communications block 94 includes a demultiplexer to demultiplex the video image output of imager 26, the temperature output of pyrometer 22, and any control signals received from sensor head 12. Communications block 94 may also include a multiplexer to multiplex various outputs from microcomputer 112 onto video cable 92 for receipt by sensor head 12.

The graphics processor 96 produces digital outputs that are representative of graphic elements such as cursors, temperature numbers, and messages that are to be displayed on a monitor included as one of the peripheral devices 16. In that regard, graphics processor 96 responds to inputs from microcomputer 112. These inputs determine the nature of the graphic elements to be produced and may be initiated by, for example, an operator using a keyboard included in the peripheral devices 16 or by outputs from sensor head 12.

The A/D converter 98 receives the demultiplexed analog video signal from communications block 94 and digitizes it for further processing. The resultant digital video image corresponds to a two-dimensional array of pixels (picture elements). Each of the pixels represents some limited portion of the process area P. In one embodiment, a 512×480 pixel digital image is produced.

The graphics overlay 100 receives the digitized video signal from A/D converter 98, along with the digital outputs from graphics processor 96. Graphics overlay 100 responds by producing a combined digital signal that represents the video image generated by video imager 26, overlaid with the graphic elements introduced by graphics processor 96.

The D/A converter 102 converts the digital, graphics/video output of overlay 100 into analog red-green-blue (RGB) video signals. The analog (RGB) video output of D/A converter 102 is also provided to NTSC generator 110, which converts the analog video signal into a composite color signal so that the video/graphics signal can be displayed on color monitors, or recorded with a video cassette recorder, included in the peripheral devices 16.

The trackball interface 106 is employed to digitize and further process the inputs received from a trackball, included as part of the peripheral devices 16. The output of trackball interface 106 is applied to microcomputer 112 and, hence, graphics processor 96. As a result, the trackball can be used to move cursors displayed by a monitor included in the peripheral devices 16, as will be described in greater detail below.

The front panel interface 108 is employed to process the inputs received from a front panel, included among peripheral devices 16, and microcomputer 112. As a result, the type of temperature information to be sensed and displayed, for example, can be input to the processing and control system 14 by an operator via the front panel.

The last component of the processing and control system 14 to be considered is microcomputer 112. As shown, microcomputer 112 includes a central processing unit (CPU) 114, memory 116, and interfaces 118. As will be appreciated from the previous discussions, CPU 114 is responsible for controlling the operation of various components of system 14 in response to programmed instructions stored in memory 116.

3. Peripheral Devices

Finally, reviewing the various peripheral devices 16, as previously suggested, a number of such devices may be included. As shown schematically in FIG. 4, for example, peripheral devices 16 may include analog recorders 120, a trackball 122, a front panel 124, and a color monitor 126. Analog recorders 120 receive analog current outputs from current sources 104. The recorders 120 provide a permanent record of, for example, information regarding the temperature distribution of monitored areas of environment E.

The trackball 122 provides inputs to trackball interface 106 to indicate desired changes in the coordinates of cursors or other elements displayed on monitor 126. Specifically, trackball 122 is moved by the operator and translates that motion into an input that represents the desired change in cursor position. Trackball 122 may also include switches used by the operator to access functions associated with cursors or icons displayed on monitor 126.

The front panel 124 may include, for example, an alphanumeric keyboard used by the operator to enter commands and information. Panel 124 may also include soft or hard function keys used to initiate programmable or fixed operations. Front panel 124 may further include a display for confirming information entered through keyboard or controls.

Figure 7:
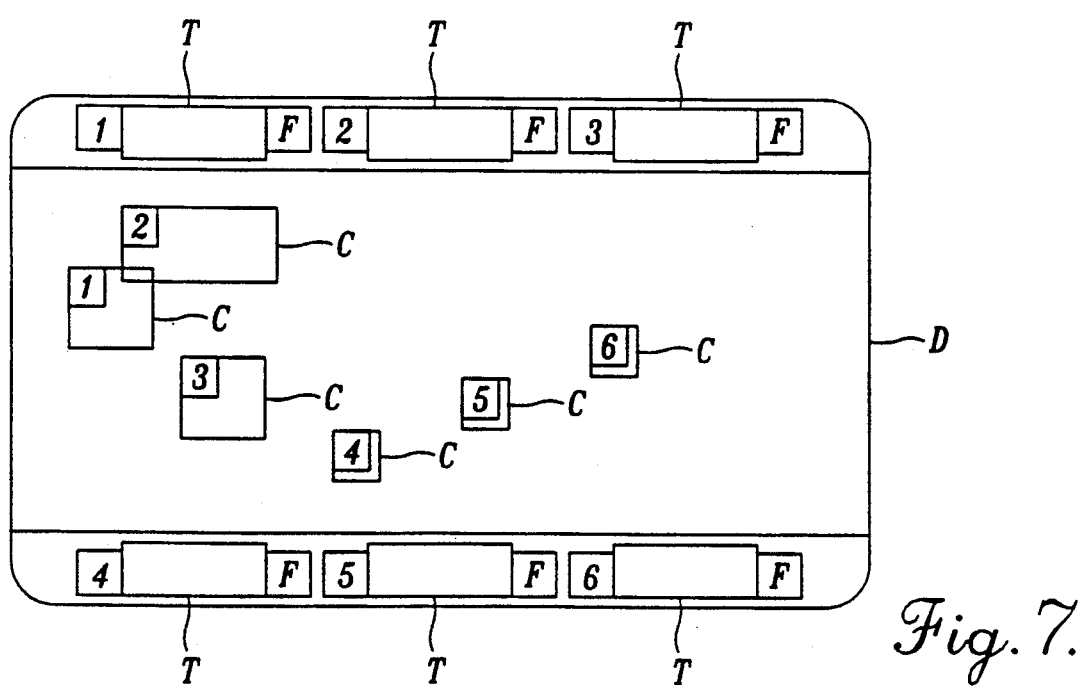
FIG. 7 is an illustration of a display generated by a monitor included among the peripheral devices of FIG. 6.

Finally, the color monitor 126 receives the output of graphics overlay 100, which includes the composite color video signals overlaid with the desired graphics and displays. In response, monitor 126 provides a display D, which, as shown in FIG. 7, includes an image of the process area P. In the preferred arrangement, the digitized image received by monitor 126 is processed to provide a color display D.

A plurality of cursors C are also displayed over the image. In the arrangement shown, these cursors C are rectangular and define or enclose various regions R over which temperature information is to be collected by the scanned pyrometer 22. An identification block, located in the upper left hand corner of each cursor C, includes a numeral used to identify the cursors.

The temperatures measured for the various regions R associated with cursors C are also provided by display D. More particularly, these temperatures are displayed in temperature displays T, arranged along the top and bottom of the display D. Each temperature display T includes an identification block, located adjacent its upper left corner, that is used to identify which cursor the temperature display is associated with. A numeric field displays the magnitude of the temperature of the region R associated with the cursor. A units block, located adjacent the upper right corner of the temperature display, displays a letter, either F. or C., that indicates whether the displayed temperature magnitude is in units of degrees Fahrenheit or degrees Centigrade.

4. Overall System Operation

Having reviewed the basic construction of system 10, its use will be considered. As a preliminary matter, system 10 is positioned to view the process area P within environment E. Then system 10 is powered ON and an initial image of the process area P is generated and displayed on monitor 126, for viewing by the operator. The operator next provides inputs to system 10 via, for example, the trackball 122 and front panel 124, to indicate the desired temperature information to be displayed on monitor 126. Finally, system 10 produces and displays the requested temperature information, along with the image of the process area P.

Discussing each of these elements of the system's operation individually, with system 10 fixedly mounted relative to the environment E and the system power turned ON, the various programs used by microcomputers 78 and 112 to control the system and analyze the information collected are initialized. Next, radiation from the environment E is received by the optical components 20 of sensor head 12.

As previously described, an optical image of the process area P is then provided along separate paths I and II to video imager 26 and pyrometer 22. The output of pyrometer 22 is amplified by amplifiers 80 and digitized by A/D converter 82. The video output of imager 26, corresponding to the optical image, is also produced and multiplexed with the pyrometer output onto video cable 92 by communications block 94.

The video cable 92 transmits the processed pyrometer and video imager outputs from sensor head 12 to the processing and control system 14. During this initial, start-up phase of operation, the operator has not yet identified the temperature information to be produced, so further processing of the pyrometer output is not performed.

The video output is digitized by the A/D converter 98 in block 94. Because the temperature information to be produced has not yet been selected, graphics processor 96 and graphics overlay 100 may add default graphics to the basic digitized video image in the form of, for example, a predetermined number of cursor blocks of predetermined size and orientation. Alternatively, processor 96 and overlay 100 may withhold the addition of graphics to the digitized video image until some operator input is provided.

The video image is ultimately processed by NTSC generator 110 for display as a visible, color image of the process area P on monitor 126. If desired, some form of shading correction or black level offset may be employed to enhance the image produced. Once the initial image of the process area has been displayed on monitor 126, the operator can then select the regions R of the displayed area whose temperatures are to be measured.

In that regard, the operator may initiate the appearance of a cursor on the display D by actuating a switch on trackball 122. Alternatively, a default cursor or cursors may already be displayed. The locations and dimensions of the cursors are then controlled by moving trackball 122 in the x and y directions. Graphics processor 96 and overlay 100 initiate an adjustment in the display in response to the trackball inputs. When a displayed cursor has the desired parameters, the trackball switch is actuated again to lock the cursor in place.

In this manner, one or more cursors C can be used to enclose regions R whose temperatures are to be measured. The ability of system 10 to monitor the temperature of a plurality of regions is useful in a variety of applications. For example, metal heating furnaces are often used to uniformly heat large pieces of metal to a desired temperature. To ensure the furnace is operating properly, accurate information regarding the distribution of temperature across the workpiece is required.

Similarly, the ability to adjust the size and location of a given region R monitored by system 10 can be important for many applications. For example, the shape of the load in many furnaces varies with time. As a result, it may be necessary to periodically redesignate the region R whose temperature is to be measured.

As will be appreciated, the operator may also input additional information for use by system 10 via the front panel 124. For example, the operator may enter an instruction indicating whether the average, maximum, and/or minimum temperatures of the regions R identified by the cursors are to be displayed, or what type of color palette is to be used with the screen. Similarly, front panel 124 may be used to indicate which ones of the various peripheral devices 16 outputs will be used as output devices.

Once microcomputer 112 has received and stored these various inputs, system 10 next collects and displays the information requested. In that regard, the pyrometer 22 and video imager 26 continue to provide outputs to processing and control system 14 in the manner previously described. Because system 10 has now been instructed to collect specific temperature information, however, the output of pyrometer 22 is processed.

To illustrate how that output is processed, first assume that a single cursor C is entered on the display, indicating that the temperature of a single region R of the process area P is to be measured. Also, assume that the region R identified by the cursor C is the same size as the area normally viewed by pyrometer 22, and that translation stage 24 has been used to position pyrometer 22 so that it receives radiation from the actual region R whose temperature is to be measured. Given these assumptions, the output of pyrometer 22 continuously provides all the information required to produce the desired temperature outputs.

As a result, microcomputer 78 computes the temperature of region R and the demultiplexed output from communications block 90 is used by microcomputer 112 to generate the desired temperature display at monitor 126. In that regard, because the entire region R is viewed by pyrometer 22, the resultant temperature measurement is effectively an average temperature of the region R. If the maximum or minimum temperature is also desired, microcomputer 112 simply monitors temperature over some programmed interval of time and initiates the display of the maximum or minimum temperature measured during that interval.

Having reviewed the basic processing of the pyrometer's output, more complicated scenarios are now to be considered. In that regard, first assume that a single region R has been selected with a cursor and the size of the region R corresponds to the pyrometer's field of view, but that the position of the pyrometer 22 does not presently correspond to the region identified by the cursor.

The CPU 114 first determines the coordinates of the cursor relative to the display D, along with the present coordinates of pyrometer 22 relative to the adjustment range of translation stage 24. By accessing a comparative scale between the two coordinate systems, stored in memory 116, CPU 114 can then determine the change in the pyrometer's position that is required to cause pyrometer 22 to receive radiation from the region R of interest. An output indicative of the desired change is then provided to the positioning controls 76 on sensor head 12 to initiate the desired adjustment in translation stage 24 and pyrometer 22. At that point, the output of pyrometer 22 is processed in the manner described above and the desired temperature information displayed in the temperature display T adjacent the image of process area P.

Next, consider the situation where the field of view of pyrometer 22 no longer corresponds to the area of the region R whose temperature is to be measured. As will be appreciated, if the region R is smaller than the region that pyrometer 22 receives radiation from, the output of pyrometer 22 can be used directly, although it may be influenced by the temperature of objects outside the region imaged within the cursor. If desired, the display D may include an output indicating that the temperature measurement might be biased by objects outside the region R.

Alternatively, the area viewed by pyrometer 22 can be reduced. As will be appreciated, this could be accomplished by adding an adjustable aperture to optical path I and instructing CPU 114 to regulate the size of the aperture in accordance with the size of the region R. Due to the added complexity of such an arrangement, however, it is not presently preferred.

If the region R whose temperature is to be measured is larger than the pyrometer's field of view, pyrometer 22 can be scanned to collect information regarding the temperature of the entire region R. In that regard, CPU 114 responds to programmed instructions to initiate motion of translation stage 24 and pyrometer 22 in the manner described above. Specifically, CPU 114 continuously executes the program, causing incremental adjustments in the pyrometer's position until the entire region is scanned. The analyzed output of pyrometer 22 from sensor head 12 is stored by CPU 114 at each such position.

Then, when pyrometer 22 has been scanned over the entire region R, CPU 114 determines and displays the average, maximum, and minimum temperatures for the scanned region, as desired. As will be appreciated, these displays can be updated each time a new scan is completed. The maximum rate at which translation stage 24 and pyrometer 22 can be scanned, while still producing accurate data, are dependent upon various aspects of the pyrometer 22, environment E, and stage 24. Below that maximum rate, however, the scan speed of the pyrometer can be set by the operator as part of the initialization at block 132.

Finally, assume that the temperature of more than one region R of the process area P is to be monitored. In that regard, appropriate cursors identifying the various regions R are entered into the display D. CPU 114 then initiates scans of translation stage 24 and pyrometer 22 over each of the regions R in sequence, as described above. The output of pyrometer 22 is stored during the scan of each region and the desired temperature information computed by CPU 114 and displayed.

As will be appreciated, with an image of the process area P and the temperature of various regions of interest displayed, an operator can then evaluate the process. As part of that evaluation, the operator may review the image to determine whether environmental factors may be disturbing the temperature measurements produced. The information collected can then be used as feedback to control the process via process controls 18.

The construction and use of system 10 in the preceding manner has a number of advantages over prior art imaging and temperature monitoring systems. In that regard, the combined use of imaging and temperature information allows process conditions to be more accurately evaluated by, for example, using the imaging information to determine the likely accuracy of the temperature information. Because the system uses a video imager to collect the image data and a separately scanned pyrometer to collect all of the temperature data, however, imaging can be enhanced through the use of shading correction and black level offset without impacting the temperature data. Finally, the use of the scanned pyrometer to separately collect the temperature data advantageously allows broader wavelength sensitivity to be achieved than if a video imager is used to collect temperature information.

5. Specific Applications

To further illustrate the use and advantages of system 10, a few applications of particular interest will now be considered. One such application of interest involves the viewing of burner flames. In that regard, to optimize the operation of most industrial burners both the shape and temperature of a number of separate burner flames must be observed. However, given the irregular shape of the flame, conventional systems have difficulty measuring the flame's temperature. Further, smoke and dust present in the burner environment may obscure the flame.

A system 10 used to monitor burner flames advantageously employs a two-color pyrometer 22. The ratiometric approach used by the two-color pyrometer 22 reduces obscuration introduced by smoke and dust. Also, the two-color pyrometer 22 allows the temperature of irregularly shaped flames to be easily measured.

In that regard, because the two-color pyrometer 22 responds to relatively short wavelength radiation, the output of pyrometer 22 is almost entirely indicative of the hottest objects in its field of view. As a result, even if a burner flame forms only twenty percent of the measurement region defined by a cursor on the display D, the output of pyrometer 22 will represent the flame's temperature rather than the temperature of the background region.

As will be appreciated, system 10 may also be used in a variety of other environments E, such as furnaces, kilns, and chemical recovery boilers to monitor process conditions. In addition, system 10 may be used in relatively cool environments to monitor objects such as integrated or printed circuits.

Those skilled in the art will recognize that the embodiments of the invention disclosed herein are exemplary in nature and that various changes can be made therein without departing from the scope and the spirit of the invention. In this regard, and as previously mentioned, the invention is readily embodied with a video imager that responds to visible or infrared radiation. Similarly, the pyrometer used may be any one of a variety of different types. Further, it will be recognized that the construction and operation of the translation stage may be varied, depending, for example, on the scanning requirements imposed by the environment. For example, a translation stage that is adjustable in one dimension could be used if temperature information is to be collected from only a linear arrangement of regions within the environment. Alternatively, a translation stage that is adjustable in three dimensions could be used to alter the pyrometer's effective field of view in response to adjustments in cursor size. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A system for monitoring the temperature of select regions of an area of interest, said system comprising:
   imaging means for receiving radiation from the area of interest and producing an image output that represents an image of the area;
   display means, responsive to said image output, for displaying an image of the area;
   selection means for allowing at least one select region of the area to be selected on the image displayed by said display means;
   temperature-sensitive means for receiving radiation from the at least one select region and producing a temperature output that represents the temperature of the selection region; and
   control means, responsive to said selection means, for controlling which of the at least one select regions radiation is received from by said temperature-sensitive means.

2. The system of claim 1, wherein said display means is further for receiving said temperature output and for displaying the temperature of the one select region.

3. The system of claim 2, further comprising processing means for enhancing said image output and said temperature output for display.

4. The system of claim 3, wherein said processing means is for enhancing said image output to correct the shading of the image displayed without influencing the temperature output.

5. The system of claim 1, wherein the area emits radiation, said imaging means comprises a video imager for producing a video output in response to radiation received from the area, and said temperature-sensitive means comprises a pyrometer for producing a pyrometer output in response to radiation from the one of the select regions.

6. The system of claim 1, wherein said control means comprises adjustable support means for supporting said temperature-sensitive means relative to said imaging means for movement in two dimensions.

7. The system of claim 6, wherein said control means comprises processing means for producing a positional output indicative of a desired position of said temperature-sensitive means relative to said area, and drive means for adjusting said adjustable support means in response to said positional output.

8. The system of claim 6, wherein said adjustable support means comprises:
   a support structure coupled to said temperature-sensitive means;
   a first bearing, coupled to said support structure and extending in a first direction;
   a second bearing, coupled to said support structure and extending in a second direction that is substantially perpendicular to the first direction;
   a first motor having a telescoping shaft, said motor being fixedly supported relative to said imaging means and said shaft being engageable with said first bearing to induce translation of said first bearing and said support structure in the second direction; and
   a second motor having a telescoping shaft, said motor being fixedly supported relative to said imaging means and said shaft being engageable with said second bearing to induce translation of said second bearing and said support structure in the first direction.

9. The system of claim 1, wherein said control means comprises adjustable mirror means for controllably directing radiation from the at least one select region to said temperature-sensitive means.

10. The system of claim 9, wherein said positional output produced by said control means is indicative of a range of positions through which the temperature-sensitive means is to be scanned by said adjustable support means.

11. The system of claim 10, wherein said range of positions indicated by said positional output is adjustable.

12. The system of claim 1, wherein the area emits radiation and wherein said system further comprises first and second optical paths for transmitting the radiation, said imaging means receiving radiation along said first optical path and said temperature-sensitive means receiving radiation along said second optical path, at least a portion of said first and second optical paths being common.

13. A method of collecting information about an area of interest that emits radiation and includes a plurality of regions, said method comprising the steps of:
   supporting a pyrometer relative to a video imager in a predetermined relative alignment;
   receiving the radiation emitted by the area with the video imager to produce a video output that represents an image of the area;
   receiving the radiation emitted by one region of the area with the pyrometer to produce a temperature output that represents the temperature of the region; and
   adjusting the predetermined relative alignment between the pyrometer and video imager to allow the pyrometer to receive radiation from a different one of the plurality of regions.

14. The method of claim 13, further comprising the step of displaying the image of the area, the position of the one region with respect to the area, and the temperature of the region.

15. The method of claim 14, wherein said step of adjusting comprises the steps of:
identifying a select region of the image of the area displayed; and
providing an output to an adjustable translation stage that supports the pyrometer to adjust the position of the pyrometer relative to the radiation received in response to the select region identified.

16. An imaging and temperature measuring system for producing an image of an area and for measuring the temperature of select regions within the area, said system comprising:
optical imaging means for producing an optical image of the area;
video imaging means for receiving the optical image and producing a video image;
temperature measurement means for receiving a limited portion of the optical image corresponding to a select region of the area and producing a direct temperature measurement in response to the limited portion of the optical image;
adjustment means for adjusting the limited portion of the optical image received by said temperature measurement means to allow the temperature of different select regions of the area to be measured; and
display means for receiving the video image and direct temperature measurement and displaying a visible image of the area and the temperature of a select region.

17. A system for producing a visible image of an area that is emitting radiation and for measuring the temperature of one or more select regions included within the area, said system comprising:
optical image collection means for receiving radiation emitted by the area and producing an optical image of the area;
optical image splitting means for splitting the optical image of the area into a first part and a second part;
video imaging means for receiving the first part of the optical image and producing a video image, representative of the entire area, in response thereto;
a pyrometer for receiving a limited portion of the second part of the optical image, representative of a limited portion of the area, and producing a temperature output in response thereto;
translation means for movably supporting said pyrometer relative to the second part of the optical image to adjust the limited portion of the second part of the optical image received by the pyrometer;
selection means for producing a selection output representative of a select region of the area whose temperature is to be measured;
control means for receiving the selection output and providing a control signal to said translation means to adjust the limited portion of the second part of the optical image to correspond to the select region;
processing means for receiving the temperature output of said pyrometer and producing a regional temperature output indicative of the temperature of the select region; and
display means for receiving the video output, selection output, and the regional temperature output and displaying a visible image of the area, identifying the select region on the visible image, and displaying the absolute temperature of the select region.

* * * * *